United States Patent
Watabe

(10) Patent No.: US 7,174,142 B2
(45) Date of Patent: Feb. 6, 2007

(54) RECEIVER HAVING A BUILT-IN ANTENNA AND METHOD OF IMPEDANCE-MATCHING FOR THE SAME

(75) Inventor: Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 93 days.

(21) Appl. No.: 11/119,694

(22) Filed: May 3, 2005

(65) Prior Publication Data

US 2005/0255818 A1   Nov. 17, 2005

(30) Foreign Application Priority Data

May 12, 2004   (JP) ............................. 2004-142753

(51) Int. Cl.
  *G06F 3/033*   (2006.01)
  *H04B 1/18*    (2006.01)
(52) U.S. Cl. .............................. 455/193.1; 455/150.1; 455/130
(58) Field of Classification Search ................ 455/107, 455/121, 129, 193.1, 78, 269, 82–83, 289, 455/248.1, 575.7, 193.2, 130, 150.1; 343/821, 343/852, 860, 861
   See application file for complete search history.

(56) References Cited

U.S. PATENT DOCUMENTS

| 5,335,368 | A  | * | 8/1994 | Tamura ..................... 455/575.7 |
| 5,754,141 | A  | * | 5/1998 | Thompson et al. ......... 343/702 |
| 6,215,456 | B1 | * | 4/2001 | Nakanishi ................... 343/895 |
| 6,219,532 | B1 |   | 4/2001 | Tanaka et al. |
| 6,590,538 | B1 | * | 7/2003 | Koyanagi et al. ........... 343/702 |
| 6,862,432 | B1 | * | 3/2005 | Kim ............................ 455/80 |
| 6,864,758 | B2 | * | 3/2005 | Luen et al. .................... 333/35 |
| 7,034,760 | B2 | * | 4/2006 | Nakamura ................... 343/745 |
| 7,109,945 | B2 | * | 9/2006 | Mori ........................... 343/861 |
| 2004/0183741 | A1 | * | 9/2004 | Nakamura ................... 343/844 |
| 2005/0130699 | A1 | * | 6/2005 | Kim ........................ 455/550.1 |

FOREIGN PATENT DOCUMENTS

| JP | A-6-283967    | 10/1994 |
| JP | A-7-111470    | 4/1995  |
| JP | A-11-98039    | 4/1999  |
| JP | A-2002-319821 | 10/2002 |
| JP | A-2003-163554 | 6/2003  |

* cited by examiner

*Primary Examiner*—Sonny Trinh
(74) *Attorney, Agent, or Firm*—Posz Law Group, PLC

(57) ABSTRACT

A receiver includes an antenna, an impedance-matching circuit, a receive circuit, a control circuit, a digital-to-analog (D/A) converter, a mode switch, and an EEPROM. The impedance-matching circuit includes a variable-capacitance diode. The control circuit determines an operation mode set by the mode switch. It controls the D/A converter to produce different levels of the reverse bias voltage when the operation mode is set to an adjustment mode. It determines strength of receive signals based on receive signal strength indication (RSSI) signals indicating strength of the receive signals. It determines a maximum value of the RSSI signals based on the results of the determination, and stores D/A input data corresponding to the maximum value in the EEPROM as the adjustment data. It loads the adjustment data from the EEPROM and controls the D/A converter to produce a reverse bias voltage based on the adjustment data. The D/A converter applies the voltage to the variable-capacitance diode.

7 Claims, 4 Drawing Sheets

RECEIVER HAVING A BUILT-IN ANTENNA AND METHOD OF IMPEDANCE-MATCHING FOR THE SAME

CROSS REFERENCE TO RELATED APPLICATION

This application is based on and incorporates herein by reference Japanese Patent Application No. 2004-142753 filed on May 12, 2004.

FIELD OF THE INVENTION

The present invention relates to a receiver having a built-in antenna and a method of impedance-matching for the receiver.

BACKGROUND OF THE INVENTION

In receivers having antennas within their cases, installing appropriate size antennas for receiving radio waves of target wavelengths becomes more and more difficult because of their limited space due to decreases in their sizes. If the antennas are not proper in size for receiving radio waves of target wavelengths, impedance mismatch, or a reduction in voltage standing wave ratio, occurs at input terminals of receive circuits for receiving signals from antennas. As a result, high signal receive sensitivity is not provided.

Receivers having impedance-matching circuits are proposed to solve such a problem. An example of such receivers is shown in FIG. 6A. An impedance-matching circuit 103 having an inductance L and a capacitor C is connected between an antenna 101 and a receive circuit 105. Another example of such receivers is shown in U.S. Pat. No. 6,219,532.

An impedance of the antenna 101 varies according to a radio wave environment around the antenna 101. Thus, the impedance-matching circuit 103 should be designed using parameters obtained from experiments performed in a radio wave environment in which the receiver is actually used. However, the radio wave environment greatly changes according to slight changes in mounting positions and methods of the receiver. Therefore, precisely setting the radio wave environment for the experiments is difficult. For example, the radio wave environment greatly changes according to variations in the number of electric conductors around the antenna 101 and permittivity. Such variations may occur when a metal bracket is used for mounting the receiver, or resin potting is performed on the receiver for making it waterproof. Furthermore, they may occur when a resin is provided in a space around the antenna 101.

Another problem occurs even when the proper parameters are determined for producing target characteristic, for instance, producing a characteristic curve indicated with a solid line in FIG. 6B, the VSWR of which at a target frequency is small. The problem is that the impedance at the target frequency may not be properly matched due to variations in inductance and capacitance, namely, the characteristic of the impedance-matching circuit 103. To solve this problem, building the impedance-matching circuit 103 with highly accurate components, or expanding a frequency band of the antenna 101 by reducing an antenna gain as shown in FIG. 6C. However, the impedance-matching circuit 103 becomes expensive when the highly accurate components are used, and sensitivity of the receiver is lowered when the antenna gain is reduced.

SUMMARY OF THE INVENTION

The present invention therefore has an objective to provide a receiver having a built-in antenna in which impedance-matching is properly and easily performed without reducing an antenna gain. Moreover, the receiver is configured so that impedance matching can be individually performed for each receiver. A receiver having a built-in antenna of the present invention includes signal processing means, impedance-matching means, voltage producing means, operation mode setting means, data storing means, and control means.

The signal processing means processes a signal received via the antenna and produces data related to the received signal. The impedance-matching means includes a variable-capacitance diode. The impedance-matching means is connected between the antenna and the signal processing means for matching an impedance of the impedance-matching means to an impedance of the antenna. The voltage producing means produces a reverse bias voltage applied to the variable-capacitance diode. The operation mode setting means sets a operation mode either one of an adjustment mode and a normal mode.

The data storing means stores data, including adjustment data used for the impedance matching. The control means determines the operation mode set by the operation mode setting means, produces the adjustment data by determining a level of the reverse bias voltage based on the data produced by the signal processing means when the operation mode is set to the adjustment mode, stores the adjustment data in the data storing means, and controls the voltage producing means based on the adjustment data when the operation mode is set to the normal mode. With this configuration, the impedance is easily and reliably best matched according to an environment in which the receiver receives radio wave signals without sacrificing antenna gains or using a high-precision component.

Another objective of the present invention is to provide a method of impedance matching for the receiver. With a method of the present invention, an output voltage of a voltage converter is adjusted to a level at which strength of received signal becomes maximum, and applied to a variable-capacitance diode of an impedance-matching circuit. As a result, an impedance of the impedance-matching circuit is properly adjusted to an impedance of the antenna without sacrificing antenna gains or using a high-precision component.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
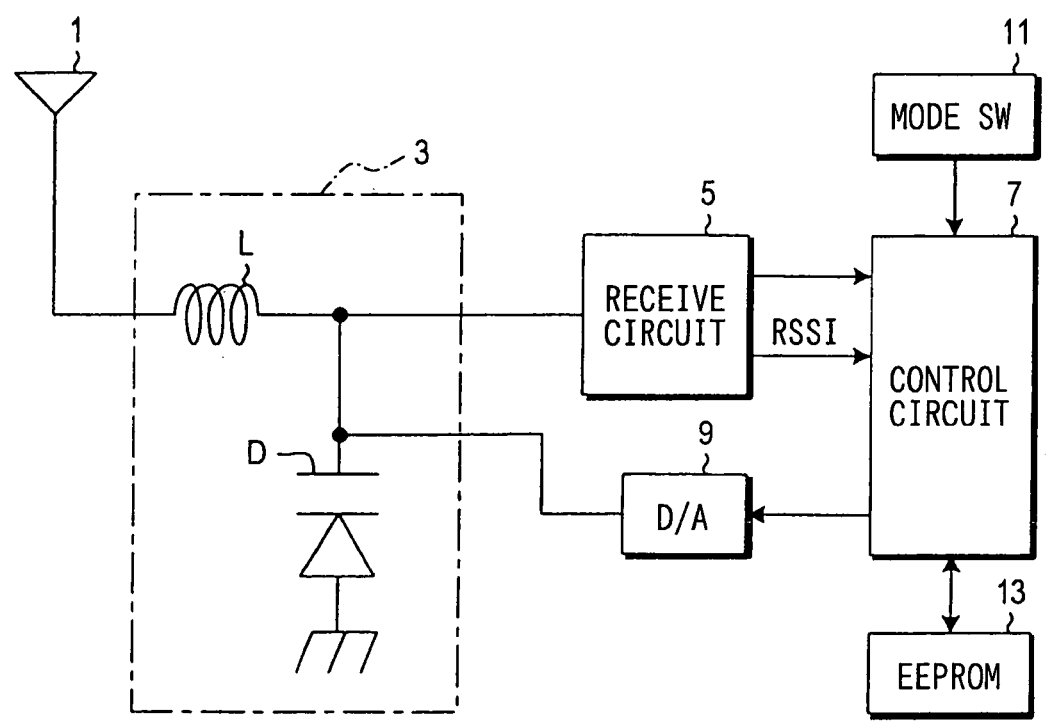
FIG. 1 is a block diagram of a receiver according to the first embodiment of the present invention.

The preferred embodiments of the present invention will be explained with reference to the accompanying drawings. In the drawings, the same numerals are used for the same components and devices.

[First Embodiment]

A receiver having a built-in antenna is shown in FIG. 1. The receiver may be used in a tire pressure monitoring system or a smart key system. A resin potting material may be applied to the receiver for making it waterproof. The receiver may be mounted to a part of a vehicle with a metal bracket.

The receiver includes an antenna 1, an impedance-matching circuit 3, a receive circuit 5, a control circuit 7, a digital-to-analog (D/A) converter 9, a mode switch 11, and an EEPROM 13. The antenna 1 receives radio wave signals. The impedance-matching circuit 3 includes an inductance L and a variable-capacitance diode D. It matches its impedance to that of the antenna 1. The receiver circuit 5 demodulates receive signals inputted via the impedance-matching circuit 3, and produces receive signal strength indication (RSSI) signals indicating strength of the receive signals.

The control circuit 7 performs various processes based on the receive data and the RSSI signals. The D/A converter 9 produces a reverse bias voltage that is applied to the diode D based on adjustment data inputted from the control circuit 7. The mode switch 11 switches an operation mode of the control circuit 7 between a adjustment mode and a normal mode. The EEPROM 13 stores the adjustment data.

Figure 2A:
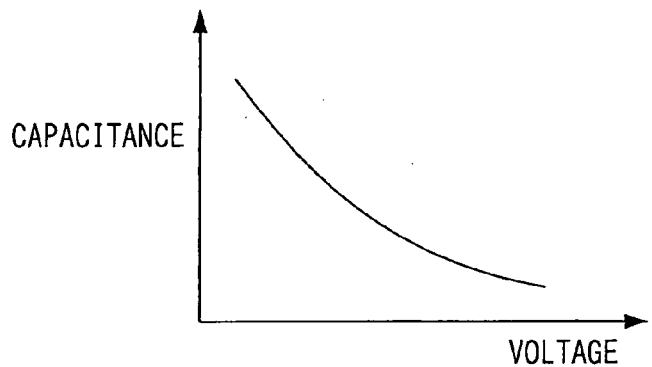
FIG. 2A is a characteristic curve of a variable-capacitance diode according to the first embodiment.

The characteristics of the impedance-matching circuit 3 can be adjusted by altering the reverse bias voltage applied to the diode D. The diode D has characteristic of capacitance that decreases as the applied voltage, which is the reverse bias voltage, increases, as shown in FIG. 2A. The control circuit 7 is configured with a microcomputer having a CPU, a ROM, a RAM, and an input and output interface. It performs a startup process when a power switch is turned on and the CPU is started.

Figure 2B:
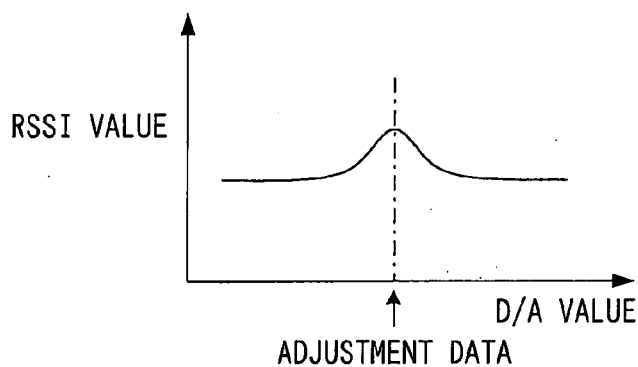
FIG. 2B is a waveform produced from results of signal strength determination according to the first embodiment.
Figure 3:
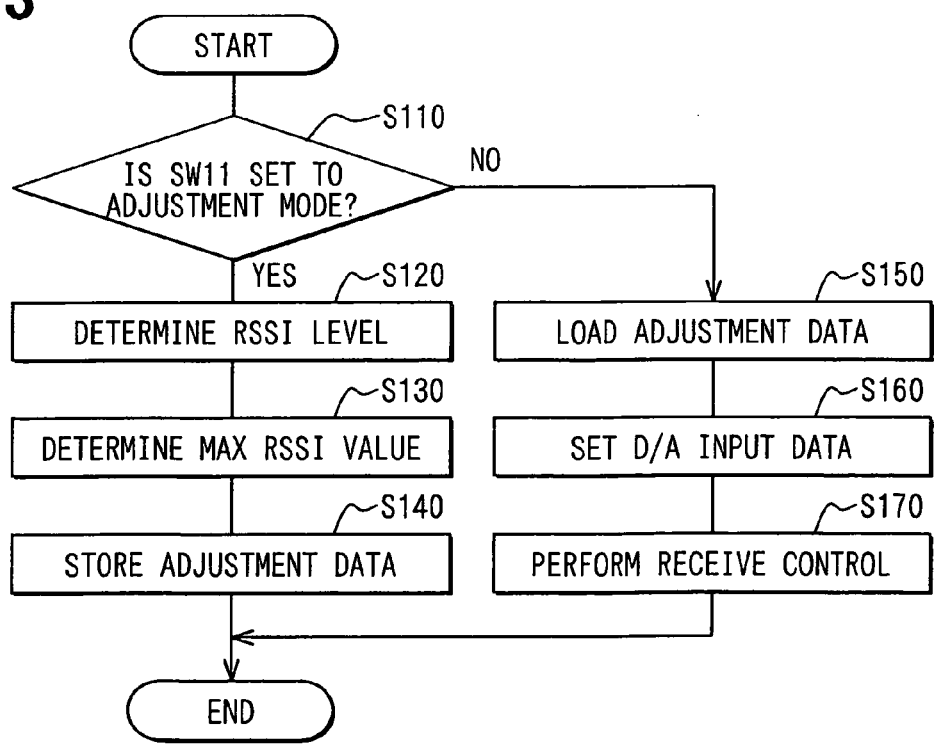
FIG. 3 is a flowchart of a startup process performed by a control circuit according to the first embodiment.

The startup process will be discussed in detail referring to FIG. 3. The control circuit 7 first determines whether the mode switch 11 is set to the adjustment mode (S110). If the mode switch 11 is set to the adjustment mode, the control circuit 7 determines strength of the receive signals, that is, levels of the RSSI signals (S120). In this determination, the control circuit 7 controls the D/A converter 9 to produce different levels of the reverse bias voltage, and stores the produced voltage levels in correspondence with data inputted to the D/A converter 9 when the bias voltages are produced. The data is referred to as D/A input data. A waveform shown in FIG. 2B is produced from the results of the determination. The control circuit 7 determines a maximum value of the RSSI signals from the results of the determination (S130), and stores the D/A input data corresponding to the maximum value in the EEPROM 13 as the adjustment data (S140). The startup process is completed when step S140 is completed.

If the mode switch 11 is set to the normal mode, the control circuit 7 loads the adjustment data stored in the EEPROM 13 (S150), and set the loaded adjustment data as the D/A input data (S160). The reverse bias voltage corresponding to the D/A input data, that is, the adjustment data, is applied to the diode D. The control circuit 7 performs regular receive control for performing various processes based on the receive data (S170), and completes this process.

In a case that the receiver is installed in a vehicle, a adjustment data setting process is performed. A series of signals (carrier) at constant strength and a frequency receivable by the receiver is outputted toward the receiver so that the series of the signals is received by the antenna 1. The operation mode is set to the adjustment mode for starting the receiver in this condition.

The D/A input data used for producing the reverse bias voltage at which the RSSI signal is at the maximum level, that is, the impedance is best matched to that of the antenna 1 is produced by the D/A converter 9 is stored in the EEPROM 13. The operation mode is fixed to the normal mode after the D/A input data is store in the EEPROM 13. The control circuit 7 loads the adjustment data stored in the EEPROM 13 every time when the receiver is started, and set it as the D/A input data. As a result, the reverse bias voltage corresponding to the adjustment data is applied to the diode D, and the impedance-matching circuit 3 is set to a condition in which the impedance is best matched. Namely, the receiver operates in the best condition.

With this configuration, the receiver is set in a condition in which the receiver is actually used, and the adjustment data the most appropriate for the receiver is set. Thus, the impedance is easily and reliably best matched according to an environment in which the receiver receives radio wave signals without sacrificing antenna gains or using a high-precision component.

In this embodiment, the receive circuit 5 is signal processing determination means, the D/A converter 9 is voltage producing means, and the mode switch 11 is operation mode setting means. The control circuit 7 is control means.

[Second Embodiment]

Figure 4:
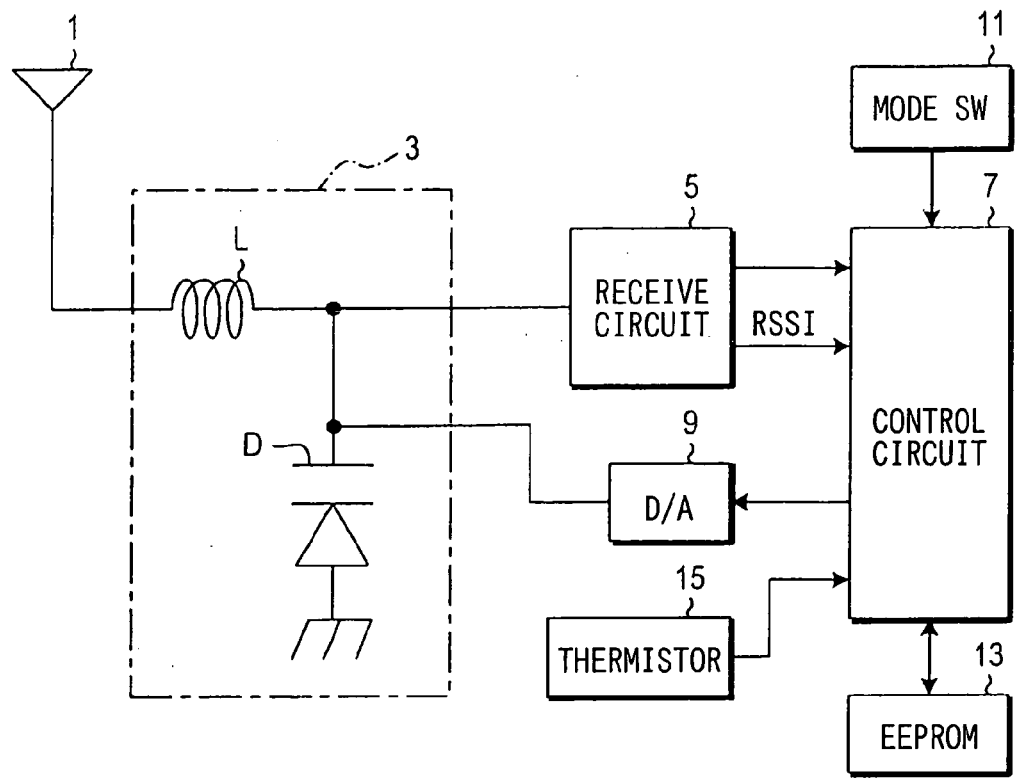
FIG. 4 is a block diagram of a receiver according to the second embodiment of the present invention.

Referring to FIG. 4, a thermistor 15 is added to the first embodiment. The thermistor 15 detects ambient temperature around the diode D. Values indicating the temperatures detected by the thermistor 15 are inputted to the control circuit 7. The ROM included in the control circuit 7 stores a correction table in which correction values are listed in association with the ambient temperatures. The correction values are used for adjusting the D/A input data to compensate for changes in characteristic of the diode D due to its temperature characteristic.

Figure 5:
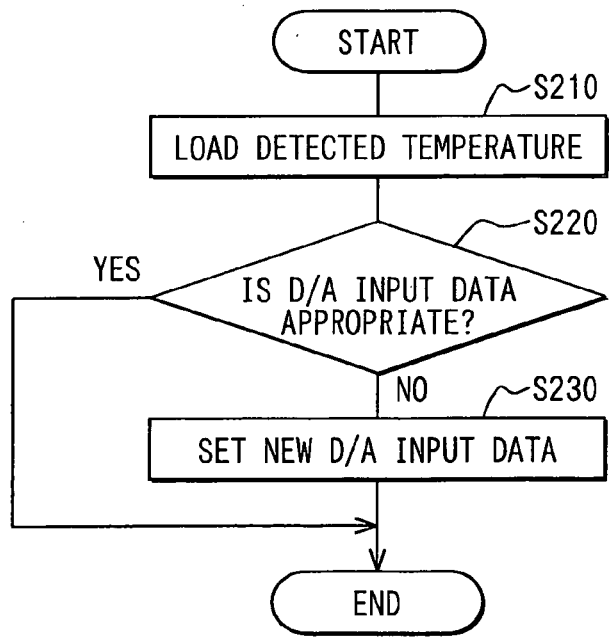
FIG. 5 is a flowchart of a data correcting process performed by the control circuit according to the second embodiment.
Figure 6A:
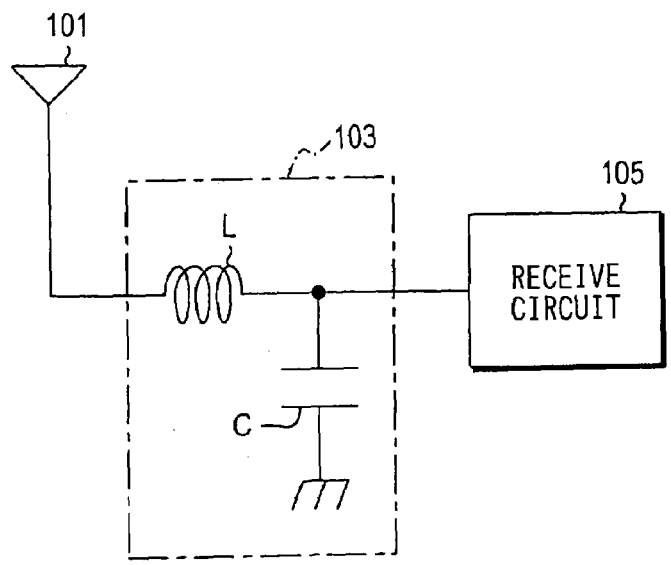
FIG. 6A is a block diagram of a receiver according to a related art.
Figure 6B:
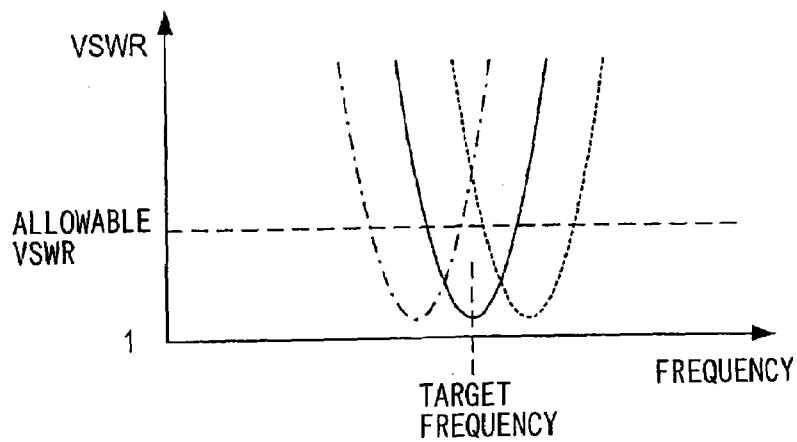
FIG. 6B is a graph showing characteristic curves according to the related art.
Figure 6C:
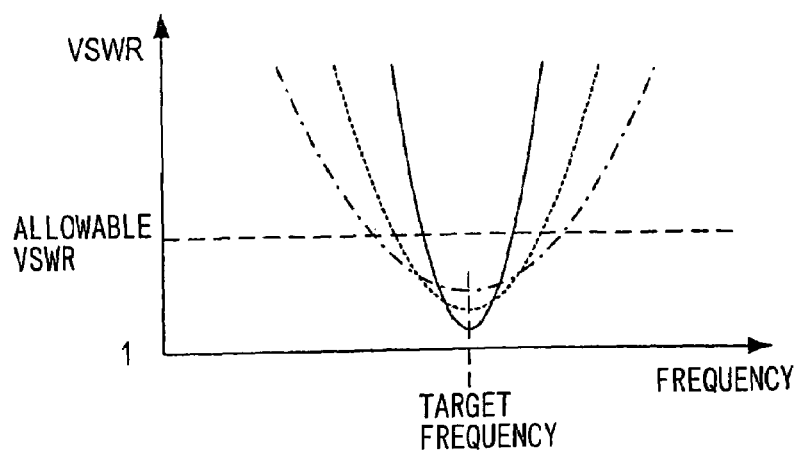
FIG. 6C is a graph showing characteristic curves according to the related art.

The control circuit 7 performs a D/A input data correcting process, which is a part of the receive control performed in step S170. The D/A input data correction process will be discussed referring to FIG. 5. This process is started periodically in predetermined intervals.

The control circuit 7 loads a value indicating a detected temperature from the thermistor 15 (S210). It refers to the correction table and determines whether the current D/A input data is appropriate for the ambient temperature based on the loaded value (S220). If the current D/A input data is appropriate, the control circuit 7 terminates this process. If it is not appropriate, the control circuit 7 obtains an appropriate value for the ambient temperature from the correction table, and set the value as new D/A input data (S230). Then, the control circuit 7 completes this process.

The adjustment data is initially set as the D/A input data. The D/A input data is corrected based on the ambient temperature detected by the thermistor 15 for compensating changes in outputs of the diode D, or the impedance-matching circuit 3, due to the temperature characteristic. Therefore, the characteristic of the impedance-matching circuit 3 is maintained in a good condition even when the outputs of the diode D varies due to the ambient temperatures. The thermistor 15 corresponds to temperature detecting means.

The present invention should not be limited to the embodiment previously discussed and shown in the figures, but may be implemented in various ways without departing from the spirit of the invention.

What is claimed is:

1. A receiver having a built-in antenna comprising:
    signal processing means that processes a signal received via the antenna and produces data related to the received signal;
    impedance-matching means having a variable-capacitance diode and connected between the antenna and the signal processing means for matching an impedance thereof to an impedance of the antenna;
    voltage producing means that produces a reverse bias voltage applied to the variable-capacitance diode;
    operation mode setting means that sets a operation mode either one of an adjustment mode and a normal mode;
    data storing means that stores data, including adjustment data used for the impedance matching performed by the impedance-matching means; and
    control means that determines the operation mode set by the operation mode setting means, produces the adjustment data by determining a level of the reverse bias voltage based on the data produced by the signal processing means when the operation mode is set to the adjustment mode, stores the adjustment data in the data storing means, and controls the voltage producing means based on the adjustment data when the operation mode is set to the normal mode.

2. The receiver according to claim 1, wherein the data produced by the signal processing means indicates strength of the received signal.

3. The receiver according to claim 2, wherein the control means determining the level of the reverse bias voltage at which the strength of the signal received by the signal processing means is maximum by:
    controlling the voltage producing means to produce different levels of the reverse bias voltage;
    determining the maximum strength of the signal based on the data produced by the signal processing means; and
    determining the level of the reverse bias voltage produced when the signal is at the maximum strength.

4. The receiver according to claim 1, further comprising temperature detecting means that detects an ambient temperature around the impedance-matching means, wherein the control means corrects the adjustment data so that changes in temperature characteristic of the variable-capacitance diode are compensated.

5. A method of impedance matching for a receiver having a built-in antenna, a receive circuit, an impedance-matching circuit, in which a variable-capacitance diode is included, a voltage converter, a mode switch, and a data storage, comprising:
    inputting signals received by the antenna to the receive circuit via the impedance-matching circuit;
    producing signal strength data that indicates strength of the received signals;
    determining whether an operation mode is set to an adjustment mode by the mode switch;
    altering levels of a voltage outputted by the voltage converter when the operation mode is set to the adjustment mode;
    determining strength of the received signals for different levels of the voltage based on the signal strength data;
    determining a level of the voltage at which the strength of the received signals becomes maximum as an adjustment voltage;
    producing data used for controlling the voltage converter to output the voltage at the determined level;
    storing the data in the data storage;
    determining whether the operation mode is set to a normal mode by the mode switch;
    loading the data from the data storage when the operation mode is set to the normal switch; and
    controlling the voltage converter based on the data.

6. The method according to claim 5, further comprising applying the voltage outputted from the voltage converter at the determined level to the variable-capacitance diode.

7. The method according to claim 5, further comprising:
    detecting an ambient temperature around the impedance-matching circuit; and
    correcting the data based on the ambient temperature so that changes in temperature characteristic of the variable-capacitance diode are compensated.

* * * * *